Feb. 27, 1945.   J. DE N. BERRYMAN   2,370,390
COOLING DEVICE
Filed July 3, 1943
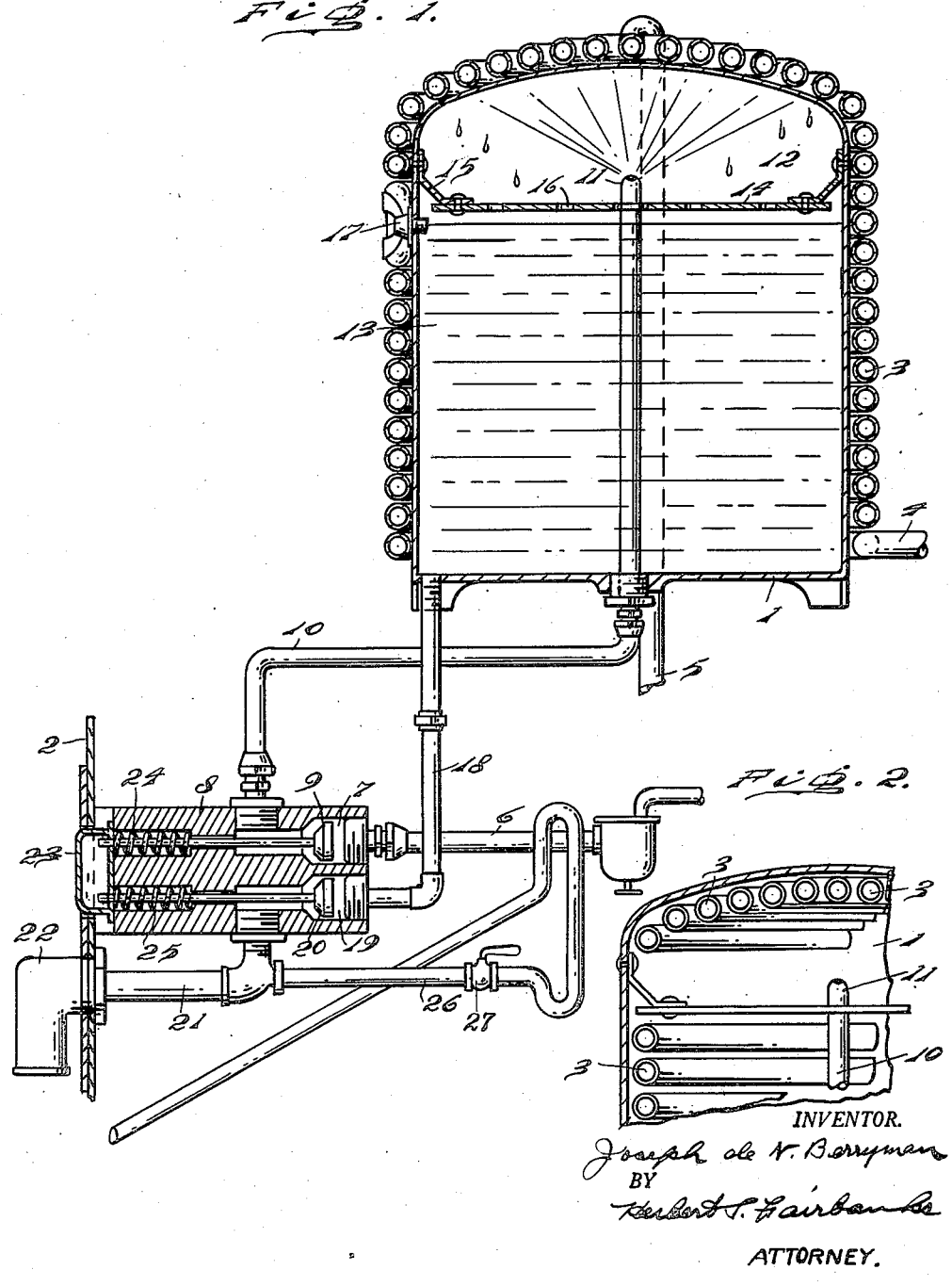
INVENTOR.
Joseph de N. Berryman
BY
Herbert S. Fairbanks
ATTORNEY.

Patented Feb. 27, 1945

2,370,390

UNITED STATES PATENT OFFICE 2,370,390

COOLING DEVICE

Joseph de N. Berryman, Philadelphia, Pa.

Application July 3, 1943, Serial No. 493,406

5 Claims. (Cl. 62—141)

The object of this invention is to devise a novel cooling device or liquid cooling system which will be very efficient in operation and which can be very economically manufactured.

It has been found to be not only difficult but costly to extract heat from a solid body of water with only surface contact with the heat extracting medium.

It is, therefore, a further object of this invention to devise a novel cooling device wherein the water or other liquid is forced under pressure through a sprayer in a cold air chamber of a storage tank above the cooled water in such tank and against the upper wall or dome of the air chamber. The tank and its dome are surrounded exteriorly or interiorly with coils through which a cooling medium is passed. The water in the form of a fine mist collects on the inner wall of the dome, is quickly cooled, travels down the sides of the tank, and also drops or falls on a cooling plate having openings to permit the cooled water to pass into the cold water storage chamber of the tank.

A further object of the invention is to proportion the volume of water admitted and discharged, and to simultaneously control such admission and discharge.

Other novel features of construction and advantage will hereinafter appear in the detailed description and the appended claims.

For the purpose of illustrating the invention, I have shown in the accompanying drawing preferred embodiments of it which, in practice, will give satisfactory results. It is, however, to be understood that these embodiments are typical only, and that the various instrumentalities of which the invention consists can be variously arranged and organized, and the invention is not limited to the exact arrangement and organization of these instrumentalities as herein shown.

Figure 1 is a sectional elevation of a cooling device, embodying my invention.

Figure 2 is a sectional elevation of another embodiment of the invention, showing the cooling coils within the dome of the tank instead of exterior thereof as in Fig. 1.

Similar numerals of reference indicate corresponding parts.

Referring to the drawing:

1 designates a combined cooling and storage tank, supported in any desired or conventional manner within an outer casing 2. The tank has its upper end closed and preferably in the form of a dome, which as well as the side walls of the tank is surrounded by coils 3, having an inlet pipe leading from a source of supply of a cooling medium and shown at 4, while the return pipe is shown at 5. The coils 3 are preferably in close proximity to the walls of the tank and its dome and may be within or exterior of the tank. In Figure 1, the coils are shown exterior of the tank, and in Figure 2 within the tank.

The liquid to be cooled, for example water, is fed under pressure from a source of supply through a pipe 6 to a chamber 7 of a valve casing 8, secured in any desired manner to the casing 2. A valve 9 controls the flow of liquid to pipe 10, which latter passes upwardly through the bottom of the tank and terminates in a centrally disposed spray nozzle 11 which causes the water in the form of a mist or fine spray to impinge against the inner wall of the dome of the tank.

The tank has a cold air chamber at its upper end as at 12, and beneath the air chamber is a storage chamber 13 for the cooled water.

A cooling plate 14 is suspended in the cooling chamber by brackets 15 connected with the walls of the tank, and the plate has openings 16.

An air vent 17 serves as a levelling device for the water in the tank when filling the tank.

The discharge of cooled water from the tank is by a pipe 18 leading from the bottom of the tank to a valve chamber 19 controlled by a valve 20, to thereby control the passage of cooled water through a pipe 21 to a discharge spout 22. Each valve is of the same construction and has its stem connected with a flanged pressure member or button 23, and the valves have springs 24 and 25, respectively, disposed between walls of the casing 8 and the button, thus tending to retain the valves 9 and 20 in their closed positions.

I preferably provide a by-pass 26 from the pipe 21 to a drain and the by-pass is provided with a control valve 27. When first filling the tank, the discharge end of the spout is closed by holding the hand against it. The main purpose of the by-pass is to prevent too high a pressure being built up in the tank when the spout is closed, since the water can by-pass to a drain through the by-pass 26. The valve 27 can be closed when initially filling the tank, and thereafter left open during the normal operation of the cooling device.

The operation will now be readily apparent to those skilled in this art and is as follows:

The air vent is opened and the discharge from the spout is blocked usually by holding the palm of the hand against it. The button 23 is now pressed inwardly to its open position as shown in Figure 1, and the water will start to spray into the tank. This continues until the water reaches the level of the air vent, and the valves 9 and 20 are closed. The air vent is closed, the outlet unblocked and the cooling device is ready for continuous use.

The water level is maintained because the duplex valve causes the same amount of liquid to be admitted as is withdrawn. The water spreads out in an atomized condition when forced through the small orifice of the spray nozzle, and since this is taking place in a cooling chamber heat is extracted from the water. Heat is extracted from the water when the spray comes into contact with the cool walls of the dome, and as it travels down such walls to the storage chamber. Heat is also extracted from the water by the cooling plate.

Having thus described my invention, what I claim as new and desire to secure by Letters Patent is:

1. In a cooling device, a tank having a storage chamber for cooled liquid in its bottom portion and having an air chamber above the storage chamber, cooling means surrounding the side walls and the top wall of the tank, means to spray liquid into the air chamber against the inner wall of the top of the tank, and a discharge pipe from the tank.

2. In a cooling device, a tank having at its bottom portion a storage chamber for cooled liquid, cooling means surrounding the side walls and the top wall of the tank, means to spray liquid into the tank above the level of the water therein and against the top wall of the tank, a cold plate having openings and positioned above the liquid level of the liquid in said tank, and a discharge pipe from the tank proportioned to the volume of liquid admitted by the spray means.

3. In a cooling device, a closed tank having a lower storage chamber and an air chamber above it, a vent to determine the level of liquid in the tank, a cold plate having openings and positioned in the air chamber, means to circulate a cooling medium around the side walls and the top wall of the tank, and means to spray liquid into the air chamber and against the top wall of the tank which is cooled by said circulating medium.

4. In a cooling device, a tank having its bottom, sides and top walls closed, a controllable vent to control the liquid level in the tank, coils for a cooling medium surrounding the side walls and the top wall of the tank, said tank having an air chamber above the liquid level of the tank, a baffle positioned in the lower portion of the air chamber, and means to spray liquid into the air chamber above said baffle and against the top wall of the tank, and means to withdraw liquid from the tank.

5. In a cooling device, a tank forming a combined liquid storage tank and an air chamber, a controllable vent to determine the liquid level in the tank, a cold plate having openings disposed in the lower portion of the air chamber, spray means centrally disposed in the air chamber to spray liquid against the top wall of the tank, means to circulate a cooling medium around the storage portion and the air chamber of the tank, and means to pass to the spray means the same volume of liquid as is being withdrawn from the tank during such withdrawal.

JOSEPH DE N. BERRYMAN.